United States Patent [19]

Nicolas

[11] Patent Number: 5,284,605
[45] Date of Patent: Feb. 8, 1994

[54] METHOD OF TREATING GAS BASED ON ELECTROLYTIC FLUORINE CONTAINING URANIUM COMPOUNDS

[75] Inventor: Francois Nicolas, Orange, France

[73] Assignee: Comurhex Society Pour la Conversion, Courbevoie, France

[21] Appl. No.: 850,883

[22] Filed: Mar. 13, 1992

[30] Foreign Application Priority Data

Mar. 27, 1991 [FR] France .................. 91 04451

[51] Int. Cl.$^5$ .................................................. G21F 9/02
[52] U.S. Cl. .............................. 252/630; 423/3; 423/258; 423/240 R; 423/484; 423/488; 62/14; 95/131; 95/290
[58] Field of Search .............. 423/3, 358, 240 R, 484, 423/488; 252/630; 55/82, 71, 66; 62/14

[56] References Cited

U.S. PATENT DOCUMENTS

| | | | |
|---|---|---|---|
| 2,830,873 | 4/1958 | Katz et al. | 423/258 |
| 3,039,846 | 6/1962 | Ogle, Jr. | 423/3 |
| 3,160,490 | 12/1964 | Fabre et al. | 423/258 |
| 3,425,812 | 2/1969 | Cousin et al. | 203/39 |
| 3,697,235 | 10/1972 | Ogle, Jr. | 423/3 |
| 3,925,536 | 12/1975 | Schuman | 423/258 |
| 4,127,163 | 11/1978 | Reti | 165/61 |
| 4,181,508 | 1/1980 | Schmid et al. | 55/82 |
| 4,299,606 | 11/1981 | Robota et al. | 62/28 |
| 4,310,501 | 1/1982 | Reh et al. | 423/484 |
| 4,830,841 | 5/1989 | Urza | 423/261 |
| 4,902,351 | 2/1990 | Kunze et al. | 134/3 |

FOREIGN PATENT DOCUMENTS

3074918A 4/1988 Japan ............................ 423/3

OTHER PUBLICATIONS

Smiley, S. H., et al. Quantitative Recovery of Uranium Hexa-Fluoride from a process Gas Stream, Feb. 1959, Industrial & Engineering Chemistry, vol. 51, No. 2, pp. 191-196.

*Primary Examiner*—Donald P. Walsh
*Assistant Examiner*—Ngoclan T. Mai
*Attorney, Agent, or Firm*—Dennison, Meserole, Pollack & Scheiner

[57] ABSTRACT

A method of treating a gas based on fluorine and containing hydrofluoric acid, and which may optionally contain condensable gaseous compounds, especially uranium compounds, and non-condensable gases. The gas is refrigerated to obtain a gaseous component containing fluorine and any non-condensable gases present, and a liquid phase containing liquid HF and condensable compounds in solution and/or suspension. The liquid phase is filtered to recover the compounds in suspension.

11 Claims, 1 Drawing Sheet

METHOD OF TREATING GAS BASED ON ELECTROLYTIC FLUORINE CONTAINING URANIUM COMPOUNDS

BACKGROUND OF THE INVENTION

1. Field of the Invention

The invention concerns a method of treating a gas based on fluorine, obtained by electrolysis from baths containing hydrofluoric acid, and which may contain gaseous uranium compounds such as uranium hexafluoride. The method enables the constituents of the gas to be recovered separately, for example hydrofluoric acid which is carried over in electrolysis or uranium hexafluoride gas emanating from its own production process.

2. Description of Related Art

It is known that fluorine gas is generally obtained by electrolysis of anhydrous hydrofluoric acid dissolved in a bath of melted fluorides, that the fluorine thus produced carries over some 5 to 15% by volume of HF, due to the partial pressure of the HF in the bath at the electrolysis temperature, and that the HF may be a troublesome impurity in subsequent applications of the fluorine.

It is also known that the applications of fluorine include use in burning solid uranium compounds to obtain gaseous uranium hexafluoride. The solid compounds are chiefly uranium tetrafluoride ($UF_4$) but also oxides or oxyfluorides where U is in the IV or VI state.

Such combustion is generally carried out with an excess of fluorine (6 to 8% relative to U), first in a primary reactor followed by a $UF_6$ crystallizer (condenser), the non-converted or non-burned compounds (about 5% of the uranium involved) then being exhausted in a secondary reactor, again followed by a $UF_6$ crystallizer. The pure uranium hexafluoride is condensed in the solid state in the crystallizers by refrigerating it to as low as $-30°$ C. HF is not condensed in the liquid state at this temperature in view of its low partial pressure.

A gaseous residue is recovered after combustion and crystallisation, including the excess fluorine, hydrofluoric acid from electrolysis which was not involved in combustion, non-condensed uranium hexafluoride and non-condensable gases, such as oxygen from the oxides introduced and/or nitrogen from various purges of the gas circuits.

The gaseous residue is normally treated—after being carefully filtered and passed into a non-return cold trap (at about $-15°$ C.)—by bringing it down (abattage) in a column using a basic solution, generally a potassium one, which leaves all the fluorine in solution in fluoride form and precipitates the uranium in the form of uranate contaminated with fluoride. The uranate cannot be recovered without undergoing a full, lengthy conversion treatment.

The fluoride solution in turn is generally treated with lime. This precipitates calcium fluoride free from uranium, which can be discarded after filtration, and regenerates caustic potash ready for recycling.

It will be appreciated that the treatment of the residue is long and difficult, that it condenses valuable products ($UF_6$, $F_2$, HF) in degraded or non-recoverable forms, that it consumes caustic potash, an expensive reagent, as a back-up material (appoint), and that there is always a danger of the discarded calcium fluoride being polluted with uranium. In addition, all the fluorine ends up in the form of discarded fluorides; this represents a large amount of effluent which is expensive to store, and a loss of fluorine which is also expensive.

SUMMARY OF THE INVENTION

To avoid these disadvantages Applicants have developed a method of treating gas based on fluorine containing hydrofluoric acid, which may contain condensable gaseous uranium or other compounds and non-condensable gases, characterised in that:

the gas is greatly refrigerated to condense HF in liquid form and the other condensable compounds, in order to obtain separately, firstly fluorine gas and non-condensable gases which are discharged and, secondly, liquid hydrofluoric acid containing the other condensed compounds in solution and/or suspension the previously obtained suspension is filtered to separate the solid condensates from the solution based on anhydrous liquid HF.

It will be seen that this method enables each constituent of the initial gaseous mixture to be recovered in a relatively pure (noble), directly re-usable form.

The initial gas based on fluorine is generally the residual, anhydrous gas, with the dust removed from it, emerging from the secondary condenser for producing uranium hexafluoride. As already mentioned, it contains fluorine in excess of the stoichiometry for obtaining $UF_6$, gaseous anhydrous hydrofluoric acid from electrolysis for producing fluorine, gaseous uranium hexafluoride which is not trapped in the secondary crystallizer and non-condensable gases (chiefly $O_2$ and $N_2$).

The volume ranges of compositions normally used may be given as an indication:

HF 10 to 50%, $UF_6$ 3 to 0.2%, $N_2$ 10 to 30%, $O_2$ 5 to 40%, $F_2$ 30 to 10%.

DETAILED DESCRIPTION OF THE INVENTION

The invention thus comprises a first stage of greatly refrigerating the gas to condense anhydrous HF in the liquid state. The temperature used depends on the partial pressure of HF in the gas mixture, but one must avoid (a) reaching the crystallization temperature of HF ($-83°$ C.) and (b) using temperature above that used in the (secondary) crystallizer from which the gas to be treated emerges. In practice one operates at a temperature of $-78°$ C.$\pm 3°$ C. and preferably at $-80°$ C.; if a lower temperature is used there is a danger of condensing solid HF and clogging the installation, while at too high a temperature the yield from the condensation of HF is inadequate.

Any types of heat exchangers or condensers, where a cold-carrying fluid and the gas to be treated are not in contact, are suitable to carry out this refrigeration. Thus tubular or plate-type heat exchangers may be used, in which the condensed HF trickles over the exchange surface so as to carry away the condensed solid $UF_6$. The heat exchange surfaces are preferably vertical for this purpose.

It is important to minimise the difference between the highest and lowest temperature of the cold-carrying fluid during heat exchange with the gas to be treated. Hence one preferably operates so that one is permanently in the presence of liquid and gas phases at the selected refrigeration temperature in the cold-carrying fluid circuit. Fluorinated hydrocarbons known by the brand name of Fréons are generally used. It is advantageous for said circuit to be an entirely closed and sealed chamber, to have an expansion vessel and to remain under pressure, and for the cold-carrying fluid to have a pressure/vaporisation temperature curve compatible with both the selected refrigeration temperature and reasonable pressures of up to 25 to 40 bar. It is also advantageous for the cooling kilogram-calories to be supplied to the cold-carrying fluid by means of a separate cold-generating fluid, e.g. liquid nitrogen circulating in a separate circuit fitted with a heat exchanger. Thus the cold-carrying fluid responsible for condensation is separated and insulated from the cold-generating fluid responsible for heat dissipation.

During said refrigerating operation the mixture of excess fluorine gas (which may contain some traces of non-condensed HF) and non-condensable gases is discharged to be re-used as such or after compression. Alternatively it may be passed into a column for washing with caustic potash, as described above, in which case the fluorine is recovered in the form of non-contaminated potassium fluoride which can be marketed; or again it may be treated directly with lime, with an insoluble calcium fluoride being discarded. The non-condensable gases free from fluorine can thus be discharged.

As for the hydrofluoric acid and hexafluoride, these are condensed in liquid and solid form respectively; the acid trickles over the heat exchange surfaces of the cold-carrying fluid circuit, carrying along the solid hexafluoride particles. A suspension of solid $UF_6$ in liquid HF is obtained, the latter also containing a small quantity of $UF_6$ in solution due to a very low residual solubility; the suspension is kept at low temperature to avoid solubilising solid $UF_6$ in HF.

If accumulations of solid ($UF_6$) form in the condenser, all that has to be done is to raise its temperature to 60° to 80° C. in order to sublimate $UF_6$ and clean the apparatus.

At the following stage, according to the invention, the suspension kept at low temperature is filtered to retain the suspended solid ($UF_6$) and discharge the liquid HF. The liquid HF may be used as it is, provided that its low residual content of $UF_6$ is not troublesome. Filtration can easily be carried out through any type of porous material which is resistant to the medium (anhydrous HF, $UF_6$ etc), generally with a porosity of about 20 μm; it takes place immediately, at a speed generally exceeding 5 m$^3$/m$^2$.h or even 15 m$^3$/m$^2$.h. Fritted materials are very appropriate (for example filtering bulbs) but so are cloths, if necessary in several thicknesses, fibre mats and the like. The materials used may be metals, normal or stainless steels, alloys based on Cu, Ni, Cr (monel) etc, but also composites, ceramics, synthetic materials (teflon) etc.

As before, the pure $UF_6$ retained on the filter is recovered by sublimation at from 60° to 80° C. and passed to a crystallizer, after which it is given the usual conditioning treatment. Over 99.5% of the $UF_6$ present in the residual gases to be treated is generally recovered at this stage.

If one wishes to improve the purity of the liquid HF recovered in filtration, still containing soluble residual $UF_6$, one can advantageously vaporise the HF, according to the invention, at about 20° to 30° C. then pass it through a bed of activated carbon, which fixes all the remaining $UF_6$ by forming a stable combination with carbon. Carbon normally fixes uranium element equal to 70% to 130% of its weight. The purification treatment makes it possible to obtain an HF containing less than 10 ppm of U, typically less than 1 ppm of U, and generally even less than 0.5 PPM.

The activated carbon normally has a particle size from 2 to 10 mm, in order to avoid any excessive pressure drop and to aid the passage of the gas to be purified, as well as good access porosity and an adequate specific surface area to obtain an effective action. Before use, it is preferable to desorb the carbon hot under vacuum ($\simeq$ 140° C.) in order to eliminate any trace of air or humidity.

After the fixation process the bed of activated carbon is heated to about 140° C. at low pressure, to remove and recover the HF which was adsorbed by the carbon during fixation. After desorption the carbon is treated chemically to break down the stable association between the $UF_6$ and carbon and to recover the uranium. The treatment may be either hydrolysis by $H_2O$ to obtain soluble $UO_2F_2$, or in a slightly basic medium or in an acid medium (e.g. $HNO_3$). The recovery treatment may equally comprise combustion of the carbon to obtain a recoverable uranium-containing ash.

The bed of activated carbon, normally contained in a column, is advantageously fitted with a coil. The coil enables it either to be cooled when the HF gas passes through, with part of the HF being adsorbed on the carbon in liquid condensed form and with liberation of heat corresponding to the condensation, or enables the bed to be heated to desorb the adsorbed HF.

DESCRIPTION OF THE PREFERRED EMBODIMENT

Figure 1:
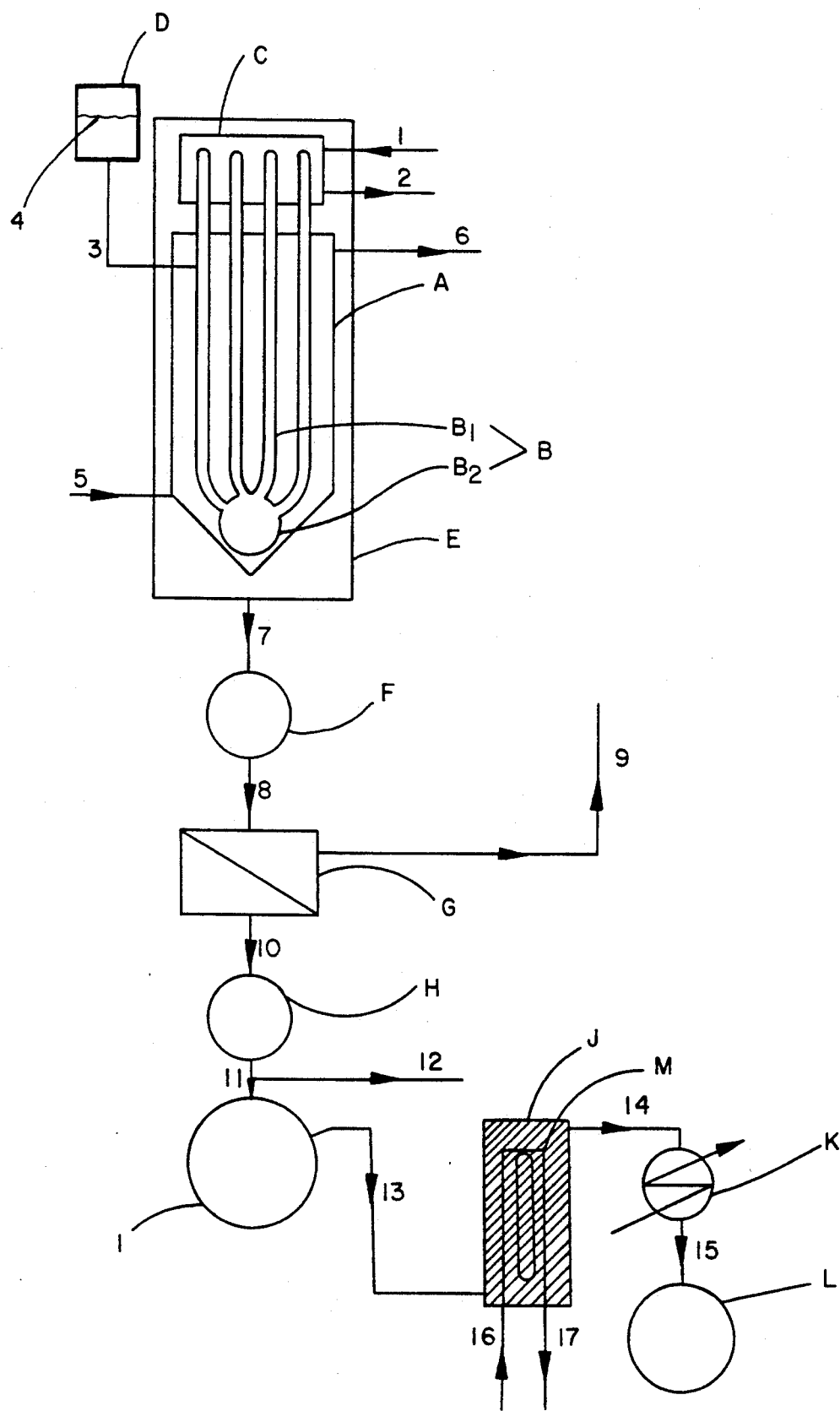
FIG. 1 is a schematic illustration of the process steps of the invention.

FIG. 1 illustrates the method of the invention. It particularly includes the advantageous condensation arrangement and the additional treatment to purify the HF collected.

A represents the condenser/heat exchanger chamber, with the residual gas to be treated entering it at 5, the purified fluorine and non-condensable gases leaving it at 6 and the anhydrous liquid HF and solid $UF_6$ in suspension leaving it at 7.

B represents the closed cold-carrying fluid chamber, a kind of heating tube, made up of vertical heat exchange tubes B1 which are interconnected by a header B2 and an expansion vessel D. The vessel D has a liquid-gas interface 4 and is connected to the closed chamber B by a tube 3. The liquid and gas phases of the cold-carrying fluid are always present in the closed chamber, so there is a constant condensation temperature. The chamber is under pressure. The heat exchange surfaces of the vertical tubes are self-cleaned by the trickling of the liquid condensed HF, which carries away the solid particles of condensed $UF_6$ in suspension.

C represents a heat exchange arrangement for supplying cooling kilogram calories to the cold-generating liquid contained in the chamber B. In this case it is a solid heat exchanger, containing the tubes C and a separate circuit for the cold-generating fluid (for example liquid nitrogen), which enters it at 1 and leaves at 2.

E is a non-conducting jacket surrounding the condenser B and heat exchanger C.

F represents an intermediate storage capacity which receives the condensate 7, a suspension of solid $UF_6$ in liquid HF, emanating from the condenser A.

G represents the solid-liquid separation chamber, where separation may be effected e.g. by bulbs of fritted stainless steel; the suspension stored in F is fed in at 8. Liquid HF containing a $UF_6$ residue in solution (residual solubility of $UF_6$ in liquid HF) leaves G at 10 and is stored in the intermediate capacity H. The $UF_6$ left on the bulbs is discharged occasionally by heating the chamber to sublimate it, and the gas is passed through 9 to the usual crystallizers (not shown) which condense pure $UF_6$.

The HF contained in H may be discharged through 12 to be used as it is. Alternatively it may be purified, and for this purpose:

I represents a warming cabinet for vaporising HF, which is supplied through 11 from the container H; HF and $UF_6$ gas leave the cabinet through 13.

J represents an absorption column filled with granules of activated carbon in which a coil M is buried, with an inlet 16 and an outlet 17 for cooling or warming fluid. Absolutely pure HF gas leaves it at 14 (its content of U may easily not be in excess of 0.1 ppm). The HF is condensed at K then stored and made available at L via 15. Once the activated carbon is saturated with $UF_6$ it is heated by means of the coil M to desorb and recover HF exclusively; the $UF_6$ remains strongly bonded to the carbon. All that remains to be done is to empty out the activated carbon and treat it as described.

Thus it will be seen that the following can be recovered separately according to the invention:
  fluorine not polluted by U or HF but containing non-condensable gases
  pure HF, free from uranium, which can be recycled e.g. to electrolysis of fluorine or production of $UF_4$
  $UF_6$ of merchantable quality.

Thus the quantity of fluorides discarded and the danger of their being polluted with uranium are considerably reduced by the method of the invention.

EXAMPLE

This example illustrates the continuous treatment of tail gases emanating from a process in which $UF_6$ is produced by combustion of $UF_4$ in fluorine. The characteristics of the combustion are as follows:

| Fluorine Flow rate: | content of HF = 300 kg/h | 7% (volume) |
|---|---|---|
| $UF_4$ | content of $UF_4$ | 94.97% (weight) |
|  | $UO_2$ | 2% (weight) |
|  | $UO_2F_2$ | 3% (weight) |
|  | $H_2O$ | 0.03% (weight) |

The $UF_6$ gas produced is crystallized in crystallizers in series, the coldest being at $-25°$ C., at a rate of 2.52 t/h.

The gaseous residue (tail gas) leaving the crystallizer has the following properties:

|  | flow rate | 43.2 kg/h |  |
|---|---|---|---|
|  | temperature | 20° C. |  |
|  | composition |  |  |
|  | FLOW RATE |  | PARTIAL PRESSURE |
|  | kg/h | Nm³/h | hPa (mbar) |
| $F_2$ | 5,4 | 3,2 | 101,6 |
| $O_2$ | 12,9 | 9,0 | 285,6 |
| $N_2$ | 10 | 8,0 | 252,8 |
| $UF_6$ | 1,6 | 0,1 | 3,0 |
| HF* | 13,5 | 16,7 | 157,6 |
| Total | 43,3 | 37,0 | 800,6 |

*The degree of association of HF is 3 at this temperature.

It is treated in an installation of the type shown in FIG. 1.

The condenser A, which condenses HF in liquid form and $UF_6$ in solid form, is operated at $-80°$ C.; this is done by introducing 50 l/h of liquid nitrogen into the heat exchanger C at 1.

The gas phase, which leaves the condenser at 6, is at $-80°$ C. It has a total pressure of 790 hPa and is of the following composition:

|  | FLOW RATE |  | PARTIAL PRESSURE |
|---|---|---|---|
|  | kg/h | Nm³/h | hPa (mbar) |
| $F_2$ | 5,4 | 3,2 | 124,1 |
| $O_2$ | 12,9 | 9,0 | 349 |
| $N_2$ | 10 | 8,0 | 308,0 |
| $UF_6$ | 0 | 0 | 0 |
| HF | 0,7 | 0,8 | 8 |
| Total | 29,0 | 21,0 | 790 |

Thus it no longer contains any $UF_6$ and only a few traces of non-condensed HF.

As already mentioned, the stream of gas is passed to a caustic potash washing column (not shown) by way of a cold trap (not shown), which is kept at $-15°$ C. and designed to protect the condenser A from water diffused back from the washing column. It is washed with a solution of KOH at a concentration varying from 250 to 100 g/l. 18.6 kg/h of soluble KF is produced. When the KF solution has been treated with lime 12.5 kg/h of non-polluted insoluble $CaF_2$ is obtained; this is regenerated from the recyclable caustic potash and can be discarded. The non-polluted KF obtained could equally be used as it is.

The non-condensable gases ($O_2$, $N_2$) also leave the column at 30° C. and 500 hPa. They do not contain any fluorine products and can be discharged into the atmosphere.

The suspension collected at 7 is of the following composition:

|  | Flow rate (kg/h) |
|---|---|
| Liquid HF | 12.8 |
| Soluble $UF_6$ | 0.1 |
| Solid $UF_6$ | 1.4 |

It is filtered in G at $-80°$ C., by gravity through fritted stainless steel bulbs, and 12.7 kg/h of HF is recovered, containing 0.5% of U or 0.09 kg $UF_6$/h in solution. The $UF_6$, which is retained on the filters at the rate of 1.4 kg/h, is impregnated with 5% of HF. The filtered $UF_6$ is recovered by heating at $+60°$ C. for 15 h; the $UF_6$ thus sublimated is passed through 9 to the main crystallization unit. During this operation the suspension 7 is stored in F. The HF containing soluble $UF_6$ is transferred to the heating tube I which is kept at $+30°$ C. The $UF_6$ obtained is passed through a column J filled with activated carbon for fixing $UF_6$.

The purified HF obtained is condensed in K at $+10°$ C.; it contains less than 1 ppm of U and can be recycled as it is.

It will be seen that with the recovery process according to the invention the solid waste produced is only 12.5 kg/h of non-polluted $CaF_2$ at the worst, whereas with the normal process there would have been 38.3 kg/h of polluted $CaF_2$.

What is claimed is:

1. A method of treating gas based on fluorine containing hydrofluoric acid, which optionally contains gaseous condensable uranium compounds, other gaseous condensable compounds and non-condensable gases, comprising the steps of:

refrigerating the gas at a temperature sufficient to condense HF in liquid form and any other condensable compounds present, in order to obtain separately, (1) fluorine gas and non-condensable gases which are evacuated and, (2) liquid condensed hydrofluoric acid containing any other condensed compounds present in solution and/or suspension;

filtering the liquid condensed hydrofluoric acid to separate any solid condensates from a solution based on anhydrous liquid HF.

2. The method of claim 1, wherein the gas is refrigerated at $-78°$ C. $\pm 3°$ C.

3. The method of claim 1 or 2, wherein the gas is refrigerated in a heat exchanger, in the presence of the liquid and gas phases of a cold-carrying fluid contained in a closed, sealed circuit.

4. The method of claim 3, wherein the cooling kilogram-calories are supplied to the cold-carrying fluid by a cold-generating fluid, circulating in a circuit which is separate from that of the cold-carrying fluid and fitted with a heat exchanger.

5. The method of claim 1 or 2, wherein the gas is refrigerated by means of vertical heat exchange surfaces over which the liquid condensed HF containing any other condensed compounds present, trickles.

6. The method of claim 1 or 2, wherein uranium hexafluoride is a solid condensate separated in filtration and is heated in order to be sublimated and recovered.

7. The method of claim 1 or 2, wherein the liquid hydrofluoric acid recovered in filtration contains $UF_6$ and is purified by placing in gaseous form, passing the gaseous through a bed of activated carbon, which adsorbs HF and fixes $UF_6$, desorbing the HF from the activated carbon bed in gaseous form and condensing to obtain purified HF acid.

8. The method of claim 7, wherein the bed is heated to desorb HF therefrom, and the activated carbon which has fixed said hexafluoride is treated chemically to recover the uranium contained therein.

9. The method of claim 8, wherein the activated carbon is treated by hydrolysis or with an acid.

10. The method of claim 2, wherein the refrigerating temperature is $-80°$ C.

11. The method of claim 4, wherein said cold generating fluid is liquid nitrogen.

* * * * *